March 22, 1932. H. HORN 1,850,150

MACHINE FOR WORKING LIQUID, PULVERULENT, AND GRANULAR MASSES

Filed Sept. 17, 1930

INVENTOR.

Heinrich Horn.

Patented Mar. 22, 1932

1,850,150

UNITED STATES PATENT OFFICE

HEINRICH HORN, OF DRESDEN, GERMANY

MACHINE FOR WORKING LIQUID, PULVERULENT AND GRANULAR MASSES

Application filed September 17, 1930, Serial No. 482,509, and in Germany September 17, 1929.

The invention relates to a machine for working, refining, and mixing fluid, pulverulent or granular masses moved in a circular course within a heated or cooled casing by means of a rotary conveyor in cooperation with conveying ribs and strippers, the mass ascending the inner wall of the rotary conveyor, being thrown over the edge of the wall against the wall of the casing, dropping down, and re-entering the conveyor again from below.

The mixing and refining operations can be rendered far more effective if, according to the invention, the upper edge of the rotary conveyor is provided with a ring on which the mass to be worked is forced out of the conveyor and thrown against the wall of the casing by rotating strippers. In this way the mass is completely turned round and thoroughly mixed from the outer edge towards the center, which results in constant renewal and uniform tempering of the mass adjacent to the wall of the casing.

Another feature of the invention is that the air and charging flap opens outwardly so that the gap for the air inlet at the center of the axis and the air outlet is located at the outer circumference of the casing.

Figure 1:
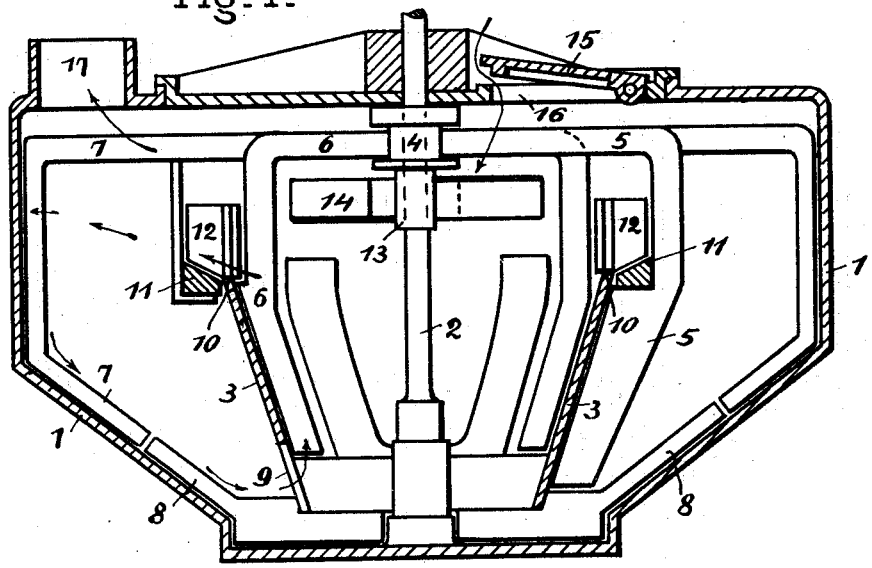
Figure 2:
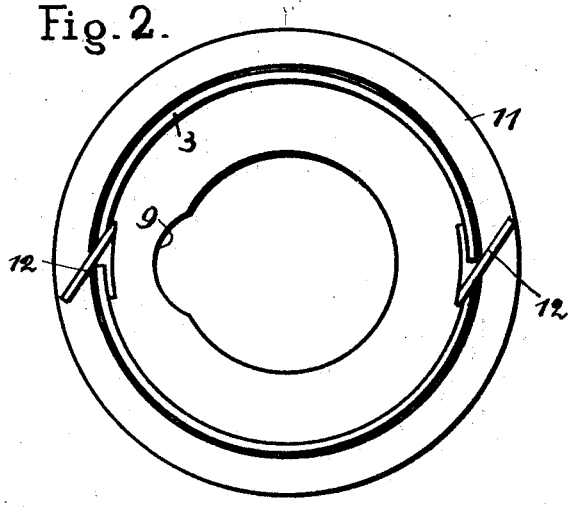

The invention is illustrated by way of example in the accompanying drawings, in which Figure 1 is a vertical section of the rotary conveyor and Fig. 2, a top view thereof.

Referring to the drawings, within the double-walled casing 1, which can be heated or cooled, a rotary conveyor 3 is disposed on the vertical shaft 2. The hub 4 of the shaft 2 carries the loosely rotatable conveying arms 5, 6 and the strippers 7. The members 8 arranged on the underside of the rotary conveyor drive the mass that has dropped down on the wall of the casing through the opening 9 into the conveyor 3.

The opening 9 may be smaller or larger, according to whether liquid or dry material is to be worked.

The upper edge 10 of the conveyor 3 is provided with a ring 11 which is preferably secured to the arms 5 and the strippers 7. The mass forced by the conveyor on to the edge is removed by the stripper plates 12 attached to the conveyor 3 and rotating therewith, and thrown against the wall of the casing. Owing to this arrangement, every particle of the mass is brought into contact with the wall of the casing while the portion of the mass contained in the central space between the rotary conveyor and the wall of the casing is changed frequently.

To insure good ventilation of the inside of the casing, the wind vanes 14 are secured on the shaft 2 to a hub 13 or the strippers 7 may serve for the purpose. The flap 15 opens outwardly so that the corresponding air gap 16 is located at the center of the axis, the air being aspirated by the wind vanes in the center and driven through the opening 17.

I claim:—

1. Machine for working, liquid, pulverulent and granular masses, particularly cocoa and chocolate masses, comprising a casing adapted to be heated or cooled, a rotary conveyor moving within the said casing, a circulating ring mounted adjacent the top edge of the said conveyor, and a plurality of strippers disposed over and coacting with the said circulating ring and adapted to throw the mass moving out of the conveyor and onto the ring off of the ring against the wall of the casing.

2. The combination according to claim 1 and a vertical shaft on which the rotary conveyor is disposed and a wind vane arranged on the said shaft and adapted to rotate in the upper portion of the casing to ventilate the same.

In testimony whereof I have affixed my signature.

HEINRICH HORN.